United States Patent
Li et al.

(10) Patent No.: US 11,640,521 B2
(45) Date of Patent: May 2, 2023

(54) INTELLIGENT FAULT DIAGNOSIS METHOD BASED ON MULTI-TASK FEATURE SHARING NEURAL NETWORK

(71) Applicant: SOUTH CHINA UNIVERSITY OF TECHNOLOGY, Guangzhou (CN)

(72) Inventors: Weihua Li, Guangzhou (CN); Zhen Wang, Guangzhou (CN); Ruyi Huang, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 17/616,686

(22) PCT Filed: Oct. 31, 2019

(86) PCT No.: PCT/CN2019/114907
§ 371 (c)(1),
(2) Date: Dec. 6, 2021

(87) PCT Pub. No.: WO2020/244134
PCT Pub. Date: Dec. 10, 2020

(65) Prior Publication Data
US 2022/0269925 A1    Aug. 25, 2022

(30) Foreign Application Priority Data
Jun. 5, 2019   (CN) .......................... 201910486472.5

(51) Int. Cl.
*G06N 3/04* (2006.01)
*G01M 13/045* (2019.01)
*G06N 3/08* (2006.01)

(52) U.S. Cl.
CPC ........ *G06N 3/0454* (2013.01); *G01M 13/045* (2013.01); *G06N 3/0445* (2013.01); *G06N 3/0481* (2013.01); *G06N 3/08* (2013.01)

(58) Field of Classification Search
CPC ...... G06N 3/0454; G06N 3/0481; G06N 3/08; G01M 13/045
See application file for complete search history.

(56) References Cited

U.S. PATENT DOCUMENTS

| 2012/0290510 A1 | 11/2012 | Faddoul et al. |
| 2019/0130275 A1* | 5/2019 | Chen .................... G06N 3/0454 |

FOREIGN PATENT DOCUMENTS

| CN | 108303253 | 7/2018 |
| CN | 108344564 | 7/2018 |

(Continued)

OTHER PUBLICATIONS

Lin et. al., "Evaluation of Deep Learning Neural Networks for Surface Roughness Prediction Using Vibration Signal Analysis", Apr. 2019 (Year: 2019).*

(Continued)

*Primary Examiner* — Omar F Fernandez Rivas
*Assistant Examiner* — Selene A. Haedi
(74) *Attorney, Agent, or Firm* — JCIPRNET

(57) ABSTRACT

A multi-task feature sharing neural network-based intelligent fault diagnosis method has the following steps: (1) separately collecting original vibration acceleration signals of rotating machinery under different experimental conditions, forming samples by means of intercepting signal data having a certain length, and performing labeling; (2) constructing a multi-task feature sharing neural network, having: an input layer, a feature extractor, a classification model and a prediction model; (3) using multi-task joint training to simultaneously train the classification model and the prediction model; and (4) inputting a vibration acceleration signal collected in an actual industrial environment into the trained models to obtain a multi-task diagnosis result.

2 Claims, 1 Drawing Sheet

(56) References Cited

FOREIGN PATENT DOCUMENTS

| CN | 109655259 | 4/2019 |
|---|---|---|
| CN | 110361176 | 10/2019 |

OTHER PUBLICATIONS

Han et. al., "An adaptive spatiotemporal feature learning approach for fault diagnosis in complex systems", Aug. 2018 (Year: 2018).*
Qian et. al., "An Intelligent Fault Diagnosis Framework for Raw Vibration Signals: Adaptive Overlapping Convolutional Neural Network", Aug. 2018 (Year: 2018).*
Zhang et. al. "Adversarial adaptive 1-D convolutional neural networks forbearing fault diagnosis under varying working condition", May 2018 (Year: 2018).*
Guo et al., "Deep Convolutional Transfer Learning Network: A New Method for Intelligent Fault Diagnosis of Machines With Unlabeled Data", Oct. 2018 (Year: 2018).*
"International Search Report (Form PCT/ISA/210) of PCT/CN2019/114907" dated Mar. 3, 2021, pp. 1-4.

* cited by examiner

INTELLIGENT FAULT DIAGNOSIS METHOD BASED ON MULTI-TASK FEATURE SHARING NEURAL NETWORK

CROSS-REFERENCE TO RELATED APPLICATION

This application is a 371 of international application of PCT application serial no. PCT/CN2019/114907, filed on Oct. 31, 2019, which claims the priority benefit of China application no. 201910486472.5, filed on Jun. 5, 2019. The entirety of each of the above mentioned patent applications is hereby incorporated by reference herein and made a part of this specification.

TECHNICAL FIELD

The present invention belongs to the field of mechanical fault diagnosis, and in particular relates to an intelligent fault diagnosis method based on a multi-task feature sharing neural network (MFSNN).

BACKGROUND TECHNIQUE

With rapid development of science and technology, machine manufacturing industry of China is entering a digitized intelligent era step by step. Mechanical equipment systems in different walks of life develop continuously towards complicated, digitalized and intelligent directions. However, mechanical devices running in states of high load, high rotating speed and high operation rate for a long time are prone to occurrence of fatigue failure, so that the downtime of the devices is caused, and even major safety accidents and huge economical loss are caused. Therefore, intelligent fault diagnosis and predictive maintenance technologies have become a hot topic researched in industrial and academic communities.

In recent years, intelligent diagnosis methods based on deep learning and data driven is widely applied in industrial practice. However, a common intelligent fault diagnosis method still has following boundedness: 1) same type faults with different degeneration degrees are regarded as various different fault modes, and the degeneration degrees are recognized by using a classification method. In an actual industrial environment, most parameters for evaluating the degeneration degrees of the devices are continuous changing physical quantities, and evaluation of degeneration of the devices by the classification method does not meet the industrial actual condition; 2) when the working condition (for example, rotating speed and load) changes, the generalization ability of a diagnosis algorithm is relatively poor. A conventional method usually improves the generalization ability of the model by increasing the sample capacity of the data set, but it is costly, time-wasting and labor-wasting and poor in implementation feasibility to collect data of all fault types under all working conditions; and 3) existing methods are mostly confined to diagnosing special tasks, for example, either fault classification or performance degradation prediction. The algorithm is poor in expandability and mobility, so that it is hard to meet the diversified and flexible diagnosis demands in the actual industrial environment.

SUMMARY

Aiming at the above-mentioned problems, the present invention provides an intelligent fault diagnosis method based on a multi-task feature sharing neutral network. The network has the characteristic of sharing multi-task features, and multi-task intelligent diagnosis can be realized simultaneously by using multi-task joint training.

The objective of the present invention is at least realized by one of the technical schemes as follows:

An intelligent fault diagnosis method based on a multi-task feature sharing neural network, the method including steps of:

(1) respectively collecting original vibration acceleration signals of a rotary machine under different experimental working conditions, intercepting a data segment with a certain length from the original vibration acceleration signals to form a sample, and performing annotation;

(2) constructing the multi-task feature sharing neural network which includes an input layer, an adaptive feature extractor based on a convolutional neural network, a fault type classification model based on a Softmax classifier and a fault degree prediction model based on a long-short time memory network, configured to diagnose fault types and predict fault degeneration degrees simultaneously;

(3) inputting a training set obtained in the step (1) into the model constructed in the step (2) under a KERAS™ framework by using a multi-task joint loss function to train the classification model and the prediction model simultaneously; and (4) inputting the vibration acceleration signals collected in an actual industrial environment into the trained models in the step (3) to realize online classification of fault types and online prediction of fault degeneration degrees simultaneously so as to obtain a multi-task result that diagnoses and predicts faults of a mechanical device.

Further, in the step (1), the original vibration acceleration signals collected by a test are one-dimensional vectors with certain length; when the data segment with the certain length is intercepted from the original vibration acceleration signals to form the samples, the samples in the data set are enhanced by using an overlapped sampling method.

Further, the adaptive feature extractor constructed in the step (2) is based on a one-dimensional convolutional neural network and is composed of an input layer, a convolutional layer and a pooling layer, and a sequential stacked structure of a plurality of convolutional layers and pooling layers extracting deep features from the vibration acceleration signals, including the specific constructing steps:

2.1) convoluting an input feature representation $Z \in \mathfrak{R}^{M \times N}$ of the input layer and convolution kernels with different dimensions to form a new feature representation $V \in \mathfrak{R}^{(M-m+1) \times (N-n+1)}$, an expression being:

$$V = W * Z = \sum_{u=1}^{m} \sum_{v=1}^{n} W_{uv} x_{i+u-1, j+v-1};$$

2.2) adding a bias for a deep feature representation V obtained in the step 2.1) and then performing nonlinear activation to obtain an output feature representation $Z^l$ with a mathematical model being:

$Z^l = \sigma(W^l * Z^{l-1} + b^l)$, where $Z^l$ is an output of the Pl layer, $Z^{l-1}$ is an output of the $(l-1)^{th}$ layer, $b^l$ is a to-be-optimized bias, the convolution kernel $W^l$ is a to-be-learned weight vector, and a is a nonlinear activation function; and 2.3) performing maximum pooling operation on the feature output in the step 2.2) so as to obtain a more abstract feature $Z^l_P$.

Further, the fault type classification model constructed in the step (2) is composed of a convolutional layer and a Softmax classifier; the prediction model is composed of stacked long-short time memory networks; inputs of the fault type classification model and the prediction model are both outputs of the adaptive feature extractor, and the fault type classification model and the prediction model share high-dimensional features extracted by the adaptive extractor.

Further, in the step (3), the present model is trained by using the loss function called the multi-task joint loss function, which is a linear weighted sum of all task loss functions with a mathematical expression being:

$$L = \lambda_1 L_1 + \lambda_2 L_2$$

where $\lambda_1$ and $\lambda_2$ are respectively loss functions of a fault type classification task and a fault dimensional prediction task; $\lambda_1$ and $\lambda_2$ are weights of corresponding tasks, and $\lambda_1 = 0.3$ and $\lambda_2 = 1.0$ are taken herein according to an effect obtained in training;

the loss function of the fault type classification task is a cross entropy loss function with an expression being:

$$L_1 = -\frac{1}{N}\left[\sum_{n=1}^{N}\sum_{k=1}^{K} 1\{y^n = k\}\log(y_k^n)\right]$$

where N and K respectively represent a sample number and a class number, $y^n$ represents a true classification of the $n^{th}$ sample, $y_k^n$ represents an activation value of the $k^{th}$ output neuron corresponding to the $n^{th}$ sample, $1\{*\}$ is an indicative function, and 1 is returned when an expression represented by "*" is true and 0 is returned when the expression represented by "*" is false;

the loss function of the fault dimensional prediction task is a mean square error (MSE) loss function, with an expression being:

$$L_2 = \frac{1}{N}\sum_{n=1}^{N}(y_{true}^n - y_{pred}^n)^2$$

where N represents a sample number, $y_{true}^n$ represents a true fault dimension of the $n^{th}$ sample, and $y_{pred}^n$ represents a neuron prediction value of the $n^{th}$ sample.

Compared with the prior art, the present invention has the beneficial effects as follows:

1) The intelligent fault diagnosis method based on a multi-task feature sharing neural network provided by the present invention can realize classification of fault types and prediction of fault degrees simultaneously, so that the diagnosis diversity is improved greatly, thereby, providing important information for evaluating comprehensive performance and degeneration degree of the device.

2) By using multi-task joint training, compared with a conventional method for training a plurality of single-task models, parameters of the model are reduced and the time complexity of the algorithm is reduced.

3) By taking the original vibration signals as input, the present invention avoids manual feature extraction and reduces dependence on professional acknowledge such as signal processing, so that the diagnosis intelligence is improved greatly.

4) The intelligent fault diagnosis method based on a multi-task feature sharing neural network provided by the present invention has a higher expansion capability, and in actual industrial applications, more task models can be added according to actual industrial scenes, so that multi-attribute intelligent diagnosis is realized flexibly, thereby having important significance in health evaluation and predictive maintenance of the device.

DETAILED DESCRIPTION

Further description of the present invention in detail will be made below in combination with drawings and specific implementation steps, but implementation modes of the present invention are not limited thereto.

Embodiment

Figure 1:
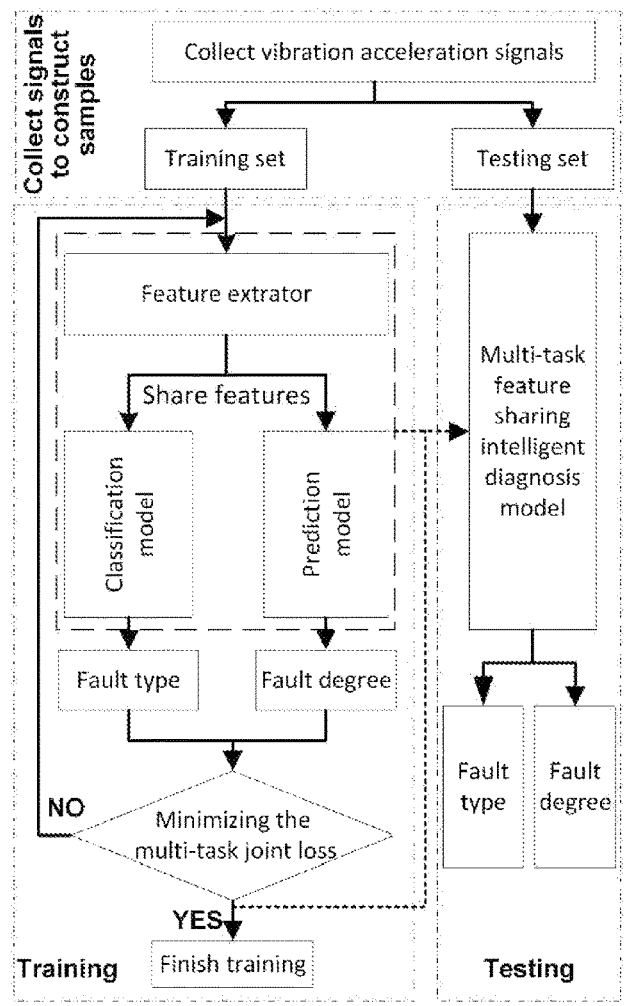
FIG. 1 is a flow diagram of an embodiment of the present invention.

As shown in FIG. 1, an intelligent fault diagnosis method based on a multi-task feature sharing neural network realizes fault classification and fault degree prediction simultaneously by taking an original vibration signal as an input and using multi-task joint training. The method includes steps of:

S1: original vibration acceleration signals of a rotary machine under different experimental working conditions are respectively collected, and then a signal data segment with a certain length is intercepted from the original vibration acceleration signals to form samples, wherein the original vibration acceleration signals collected by a test are one-dimensional vectors with certain length; when the data segment with the certain length is intercepted from the original vibration acceleration signals to form the samples, the samples in the data set are enhanced by using an overlapped sampling method, a length of the samples being 2048 points and a head-tail overlap rate of adjacent two samples being 25%.

Figure 2:
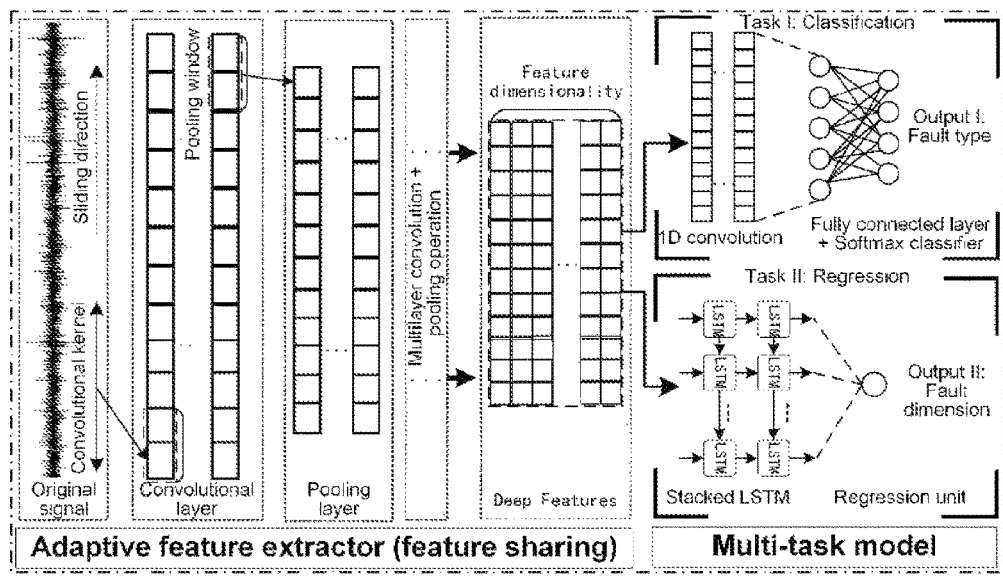
FIG. 2 is a schematic diagram of a network structure of an embodiment of the present invention.

S2: as shown in FIG. 2, constructing the multi-task feature sharing neural network includes constructing the feature extractor based on a one-dimensional convolutional neutral network, where the feature extractor is composed of an input layer, a convolutional layer and a pooling layer, and a sequential stacked structure of a plurality of convolutional layers and pooling layers extracting deep features from the vibration acceleration signals, constructing the multi-task feature sharing neural network including specific steps:

S2.1: an input feature representation $Z \in \Re^{M \times N}$ of the input layer and convolution kernels $W \in \Re^{m \times n}$ with different dimensions are convoluted to form a new feature representation $V \in \Re^{(M-m+1) \times (N-n+1)}$, an expression being:

$$V = W * Z = \sum_{u=1}^{m}\sum_{v=1}^{n} W_{uv} X_{i+u-1, j+v-1}$$

S2.2, a bias is added for a deep feature representation V obtained in the step 2.1) and then nonlinear activation is performed to obtain an output feature representation $Z^l$ with a mathematical model being:

$$Z^l = \sigma(W^l * Z^{l-1} + h^l)$$

where $Z^l$ is an output of the $l^{th}$ layer, $Z^l$ is an output of the $(l-1)^{th}$ layer, $b^l$ is a to-be-optimized bias, the convolution kernel $w^l$ is a to-be-learned weight vector, and $\sigma$ is a nonlinear activation function.

S2.3: maximum pooling operation is performed on the feature output in the step 2.2 so as to obtain a more abstract feature $Z_P^l$.

S3: fault type classification model based on a Softmax classifier and a fault degree prediction model based on a long-short time memory network are constructed.

S4: by using multi-task joint training, a training data set obtained in the step S1 is input into the model constructed in the steps S2-S3 under a KERAS™ framework to train the classification model and the prediction model simultaneously. A loss function called the multi-task joint loss function is used to train the multi-task feature sharing neural network, which is a linear weighted sum of all task loss functions with a mathematical expression being:

$$L = \lambda_1 L_1 + \lambda_2 L_2$$

where $L_1$ and $L_2$ are respectively loss functions of a fault type classification task and a fault dimensional prediction task; $\lambda_1$ and $\lambda_2$ are weights of corresponding tasks, and $\lambda_1=0.3$ and $\lambda_2=1.0$ are taken herein according to an effect obtained in training;

the loss function of the fault type classification task is a cross entropy loss function with an expression being:

$$L_1 = -\frac{1}{N}\left[\sum_{n=1}^{N}\sum_{k=1}^{K} 1\{y^n = k\}\log\left(\bar{y}_k^n\right)\right]$$

where N and K respectively represent a sample number and a class number, $y^n$ represents a true classification of the $n^{th}$ sample, $\bar{y}_k^n$ represents an activation value of the $k^{th}$ output neuron corresponding to the $n^{th}$ sample, $1\{*\}$ is an indicative function, and 1 is returned when an expression represented by "*" is true and 0 is returned when the expression represented by "*" is false;

the loss function of the fault dimensional prediction task is a mean square error (MSE) loss function, with an expression being:

$$L_2 = \frac{1}{N}\sum_{n=1}^{N}(y_{true}^n - y_{pred}^n)^2$$

where N represents a sample number, $y_{true}^n$ represents a true fault dimension of the $n^{th}$ sample, and $y_{pred}^n$ represents a neuron prediction value of the $n^{th}$ sample.

S5: the vibration acceleration signals collected in an actual industrial environment are input into the trained models in the step S4 to obtain a multi-task result. Experimental examples:

Rolling bearing is an important component of a rotary machine. In order to verify effectiveness of the method provided by the present invention, a fault classification and fault degree prediction experiment is designed by taking the rolling bearing as an object.

1. Experimental Data

An experimental data set is a rolling bearing data set of Case Western Reserve University. Acceleration data of the bearing at a driving end with a sampling frequency of 12 KHz includes three working conditions, as shown in table 1.

TABLE 1 test working conditions

| Working condition | Load (hp) | Rotating speed (rpm) |
|---|---|---|
| A | 1 | 1772 |
| B | 2 | 1750 |
| C | 3 | 1730 |

A data segment with a certain length is intercepted from the original signals to form a single training sample. A length of each sample is 2048 points and a head-tail overlap rate of adjacent two samples is 25%. Specific data set composition and sample quantity are shown in table 2.

TABLE 2

Experimental sample composition

| Bearing state | Classification | Fault diameter/mm | Fault depth/mm | Working condition A Sample capacity | Working condition B Sample capacity | Working condition C Sample capacity |
|---|---|---|---|---|---|---|
| Normal | 0 | 0.0000 | 0.0000 | 900 | 900 | 900 |
| Ball fault | 1 | 0.1778 | 0.2794 | 240 | 240 | 240 |
| | 1 | 0.3556 | 0.2794 | 240 | 240 | 240 |
| | 1 | 0.5334 | 0.2794 | 240 | 240 | 240 |
| Inner ring fault | 2 | 0.1778 | 0.2794 | 240 | 240 | 240 |
| | 2 | 0.3556 | 0.2794 | 240 | 240 | 240 |
| | 2 | 0.5334 | 0.2794 | 240 | 240 | 240 |
| Outer ring fault | 3 | 0.1778 | 0.2794 | 240 | 240 | 240 |
| | 3 | 0.3556 | 0.2794 | 240 | 240 | 240 |
| | 3 | 0.5334 | 0.2794 | 240 | 240 | 240 |
| Aggregate | | | | 3060 | 3060 | 3060 |

2. Network Parameters

The model is constructed by using the deep learning frame KERAS™ and structural parameters of the model are shown in table 3. The training optimizer is Adam, the learning rate is set as 0.001, the batch size (Batch size) is 128, and the number of iterative times (Epochs) is 20.

TABLE 3

Structural parameters of the model

| Network layer name | | Parameter | Activation function | Output dimensionality |
|---|---|---|---|---|
| Feature extraction | Input layer | / | / | (2048, 1) |
| | One-dimensional CNN layer-C1 | 128 × 15 × 8 | Relu | (256, 128) |
| | Batch standardized layer-B1 | / | / | (256, 128) |
| | One-dimensional CNN layer-C2 | 64 × 5 × 2 | Relu | (128, 64) |
| | Batch standardized layer-B2 | / | / | (128, 64) |
| | One-dimensional pooling layer-M1 | 2 × 2 | / | (64, 64) |
| | Dropout layer-D1 | 0.3 | / | (64, 64) |
| | One-dimensional CNN layer-C3 | 64 × 5 × 2 | Relu | (32, 64) |
| Task one: Fault type classification | One-dimensional CNN layer-C4 | 32 × 3 × 1 | Relu | (30, 32) |
| | Fully connected layer-F1 | 256 | Relu | (256) |
| | Dropout layer-D2 | 0.3 | / | (256) |
| | Output layer-O1 | 4 | Softmax | (4) |
| Task two: Fault degree prediction | LSTM layer-L1 | 64 | Tanh | (32, 64) |
| | LSTM layer-L2 | 32 | Tanh | (32, 32) |
| | LSTM layer-L3 | 32 | Tanh | (32) |
| | Output layer-O2 | 1 | Relu | (1) |

3. Experimental Result and Analysis

The data set is divided into a training set and a test set at a ratio of 7:3, and accuracies of the model in classification and prediction are verified respectively in three working conditions: A, B and C in a cross verification manner. In order to evaluate the accuracy of a diagnosis algorithm reasonably, the classification accuracy of fault types is evaluated by using the classification accuracy, and a prediction error of fault dimension is evaluated by using root mean square error (RMSE) with a mathematical expression being:

$$RMSE = \sqrt{\frac{1}{N}\sum_{n=1}^{N}(y_{true}^{n} - y_{pred}^{n})^2}$$

where N represents a sample number, $y_{true}^{n}$ represents a true fault dimension of the $n^{th}$ sample, and $y_{pred}^{n}$ represents a neuron prediction value of the $n^{th}$ sample. The experimental result is as shown in the table 4.

TABLE 4

Diagnosis results in different working conditions

| Working condition | Accuracy | RMSE |
|---|---|---|
| A | 100% | 0.0175 |
| B | 100% | 0.0117 |
| C | 100% | 0.0082 |
| Mean | 100% | 0.0125 |

It can be found in table 4 that in different working conditions, all the recognition accuracies of the model on the fault types reach 100%, the fault dimensions are further predicted with relative high accuracies and the mean value of RMSE in the three working conditions is 0.0125.

In conclusion, the present invention discloses an intelligent fault diagnosis method based on a multi-task feature sharing neural network, and the method realizes fault classification and fault degree prediction simultaneously by taking an original vibration signal as an input and using multi-task joint training. That is to say, first of all, the adaptive feature extractor based on the convolutional neutral network extract a universal feature including inter-multi-task shared acknowledge from the original vibration signals, and then the fault type model based on Softmax classifier and the fault degree prediction model based on the long-short time memory network realize multi-task fault diagnosis simultaneously. The experiment verifies that the method realizes classification and recognition of fault types of the bearing and regression prediction of fault dimensions simultaneously, and has relatively high actual application value.

It is to be finally noted that the above-mentioned implementation modes are merely description of a preferred embodiment of the present invention and are not limitation to the protecting scope of the present invention. Various equivalent changes, modifications and improves made on the technical scheme by those skilled in the art shall be included in the patent scope of the application without departing from the design spirit of the present invention.

What is claimed is:

1. An intelligent fault diagnosis method based on a multi-task feature sharing neural network, comprising steps of:

(1) respectively collecting original vibration acceleration signals of a rotary machine under different experimental working conditions, intercepting a data segment with a certain length from the original vibration acceleration signals to form samples, and performing an annotation;

(2) constructing the multi-task feature sharing neural network which comprises an input layer, an adaptive feature extractor based on a convolutional neural network, a fault type classification model based on a Softmax classifier and a fault degree prediction model based on a long-short time memory network, configured to diagnose fault types and predict fault degeneration degrees simultaneously; the adaptive feature extractor constructed is based on a one-dimensional convolutional neural network and is composed of the input layer, convolutional layers and pooling layers, and a sequential stacked structure of a plurality of the convolutional layers and the pooling layers to extract deep features from the original vibration acceleration signals, comprising specific constructing steps:

2.1) convoluting an input feature representation $Z \in \Re^{M \times N}$ of the input layer and convolution kernels $W \in \Re^{M \times N}$ with different dimensions to form a new feature representation $V \in \Re^{(M-m+1) \times (N-n+1)}$, an expression being:

$$V = W * Z = \sum_{u=1}^{m}\sum_{v=1}^{n}W_{uv}X_{i+u-1, j+v-1};$$

2.2) adding a bias for a deep feature representation V obtained in the step 2.1) and then performing a non-linear activation to obtain an output feature representation $Z^l$ with a mathematical model being:

$$Z^l = \sigma(W^l * Z^{l-1} + b^l),$$

wherein $Z^l$ is an output of a $l^{th}$ layer, $Z^{l-1}$ is an output of a $(l-1)^{th}$ layer, $b^l$ is a to-be-optimized bias, a convolution kernel $w^l$ is a to-be-learned weight vector, and $\sigma$ is a nonlinear activation function; and 2.3) performing a maximum pooling operation on a feature output in the step 2.2) so as to obtain an abstract feature $Z_p^l$;

the fault type classification model constructed is composed of a convolutional layer and the Softmax classifier; the fault degree prediction model is composed of stacked long-short time memory networks; inputs of the fault type classification model and the fault degree prediction model are both outputs of the adaptive feature extractor, and the fault type classification model and the fault degree prediction model share high-dimensional features extracted by an adaptive extractor;

(3) inputting a training set obtained in the step (1) into models constructed in the step (2) under a deep learning framework by using a multi-task joint loss function to train the fault type classification model and the fault degree prediction model simultaneously; the multi-task feature sharing neural network is trained by using a loss function called the multi-task joint loss function, which is a linear weighted sum of all task loss functions with a mathematical expression being:

$$L=\lambda_1 L_1 + \lambda_2 L_2$$

wherein $L_1$ and $L_2$ are respectively loss functions of a fault type classification task and a fault dimensional prediction task; $\lambda_1$ and $\lambda_2$ are weights of corresponding tasks;

the loss function of the fault type classification task is a cross entropy loss function with an expression being:

$$L_1 = -\frac{1}{N}\left[\sum_{n=1}^{N}\sum_{k=1}^{K} 1\{y^n = k\}\log(y_k^n)\right],$$

wherein N and K respectively represent a sample number and a class number, $y^n$ represents a true classification of a $n^{th}$ sample, $y_k^n$ represents an activation value of a $k^{th}$ output neuron corresponding to the $n^{th}$ sample, $1\{y^n=k\}$ is an indicative function, and 1 is returned when an expression represented by "*$y^n$=k" is true and 0 is returned when the expression represented by "*$y^n$=k" is false;

the loss function of the fault dimensional prediction task is a mean square error loss function, with an expression being:

$$L_2 = \frac{1}{N}\sum_{n=1}^{N}(y_{true}^n - y_{pred}^n)^2,$$

wherein N represents the sample number, $y_{true}^n$ represents a true fault dimension of the $n^{th}$ sample, and $y_{pred}^n$ represents a neuron prediction value of the $n^{th}$ sample; and (4) inputting vibration acceleration signals collected in an actual industrial environment into trained models in the step (3) to realize an online classification of fault types and an online prediction of fault degeneration degrees simultaneously so as to obtain a multi-task result that diagnoses and predicts faults of a mechanical device.

2. The intelligent fault diagnosis method based on the multi-task feature sharing neural network according to claim 1, wherein for the step (1), the original vibration acceleration signals collected by a test are one-dimensional vectors with the certain length; when the data segment with the certain length is intercepted from the original vibration acceleration signals to form the samples, the samples in a data set are enhanced by using an overlapped sampling method, a length of the samples is 2048 points and a head-tail overlap rate of an adjacent two samples is 25%.

* * * * *